Patented Aug. 7, 1928.

1,680,264

UNITED STATES PATENT OFFICE.

OTIS JOHNSON, OF SAN FRANCISCO, CALIFORNIA, ASSIGNOR TO I. F. LAUCKS, INC., OF SEATTLE, WASHINGTON, A CORPORATION OF WASHINGTON.

PROCESS OF TREATING SOYA BEANS.

No Drawing. Application filed May 27, 1924. Serial No. 716,214.

This invention relates to the process of obtaining extract from the soya bean by means which will permit the extract to be reduced to a base where it may be used satisfactorily in the manufacture of paint, calcimine, paper, cloth, sizings, barrel linings, adhesives, and substitutes for ivory, horn, bone, or the like as well as for food, and the provision of a process embodying steps which will permit the process to be carried on commercially with dispatch and at small cost.

Another object of the invention resides in the provision of a process wherein the oily content of the juice may be satisfactorily expelled or liberated from the juice before subjecting the latter to a curdling agent preparatory to treatment of the latter to form a base.

In carrying the process into practice, the following steps, substantially in the sequence to follow, are employed:—

Treatment of the bean.

When using the whole or natural soya bean, the beans are soaked in water for a period of twelve hours, the water not exceeding a temperature of one hundred sixty degrees Fahrenheit. The beans are then ground or rolled and crushed while in a moist state. To the mass thus treated is added approximately six parts of water not exceeding one hundred sixty degrees Fahrenheit in temperature, and I add to such water an alkali solution, such as borax, caustic soda or bicarbonate of soda.

Initial extraction of juice from the bean.

The mass treated as above is then subjected to the action of a separating process by means of which the milk or juice is extracted from the bean. The extracting of the milk or juice may be satisfactorily accomplished by means of a suitable centrifugal separator.

Separating the juice from the undissolved portions of the bean.

After the juice is initially separated from the mass, it is subjected to the action of further centrifugal treatment, whereby the undissolved portions of the bean, such as husks, are extracted from the juice. In this treatment I preferably use a suitable centrifugal separator, but inasmuch as the invention is not particularly directed to a particular separator, it shall be understood that this step of the process can be carried on in any suitable well known manner, as long as proper separation of the undissolved portions from the juice can be satisfactorily effected. However, when using a centrifugal separator, it is preferred to employ one of the type having an imperforate basket arranged in the casing or shell having a bottom discharge. In the initial treatment of separating the juice from the bean I employ a basket having perforations, and shell or casing in which the basket revolves is of the type having a bottom discharge.

Liberating the oil from the juice.

The juice, extracted as aforesaid, is then subjected to further centrifugal treatment to liberate the oil from the juice.

Curdling.

After all oil has been extracted from the juice, a curdling or precipitating agent for the proteid, such as diluted sulphuric acid, hydrochloric acid, acetic acid or alum is added to the juice and the latter is permitted to curdle, and when the curd settles to the bottom, the top or whey is drawn off.

Washing.

After the mass is permitted to curdle and the whey is drawn off, I add water not exceeding one hundred sixty degrees Fahrenheit in temperature to the curd, and this process may be repeated until the curd is thoroughly washed.

Bleaching.

In some cases it is desired to remove the yellowish tinge from the curd, and in order that this can be accomplished, an alkali is added to the curd so as to dissolve it. I then add water to the mass together with an added quantity of curdling agent to throw the mass into a curd. This step of the process may be repeated until a product of the desired color and quality is obtained.

*Moisture removing.*

After the washing process has been completed, the curd is then subjected to centrifugal treatment, preferably using an imperforate basket whose casing is formed with a bottom discharge and whereby all free moisture is thrown off from the curd.

*Drying.*

The curd is then placed in a drier, preferably one of the vacuum type employing a paddle or agitator which keeps the extract in a pulverized state. This drying is effected in the presence of a temperature not exceeding one hundred forty degrees Fahrenheit. The extract thus obtained is then ground to the desired mesh.

I have described the manner of extracting the oil free juice from the natural soya bean. Soya bean cake or soya bean meal previously treated may be used, the same being ground, and water at a temperature of one hundred sixty degrees Fahrenheit added with a weak solution of alkali, such as caustic soda, borax or the like. This mass is agitated for a period of fifteen minutes, or until such time as the extract desired has been dissolved from the bean cake or bean meal. This mass is then placed in a centrifugal separator, and the juice or milk extracted therefrom and treated in the same manner as though the whole bean had been used.

I claim:

1. In the process of obtaining as a base for an adhesive a protein extract from a leguminous seed, the steps of soaking said seed matter in water not exceeding 160° Fahrenheit in temperature; grinding the seeds while in a moist state; adding water not exceeding 160° Fahrenheit in temperature together with an alkali; extracting the juice from the mass; separating the oil from the juice; adding a curdling agent to the oil liberated juice; and removing the moisture from the curd, whereby is provided a base for an adhesive.

2. In the process of obtaining as a base for an adhesive a protein extract from soya beans, the steps of soaking said bean matter in water not exceeding 160° Fahrenheit in temperature; grinding the beans while in a moist state; adding water not exceeding 160° Fahrenheit in temperature together with an alkali; extracting the juice from the mass; separating the oil from the juice; adding a curdling agent to the oil liberated juice; and removing the moisture from the curd, whereby is provided a base for an adhesive.

OTIS JOHNSON.